May 3, 1932.　　　　F. A. DUCOTY　　　　1,857,014
PARACHUTE
Filed Nov. 2, 1931
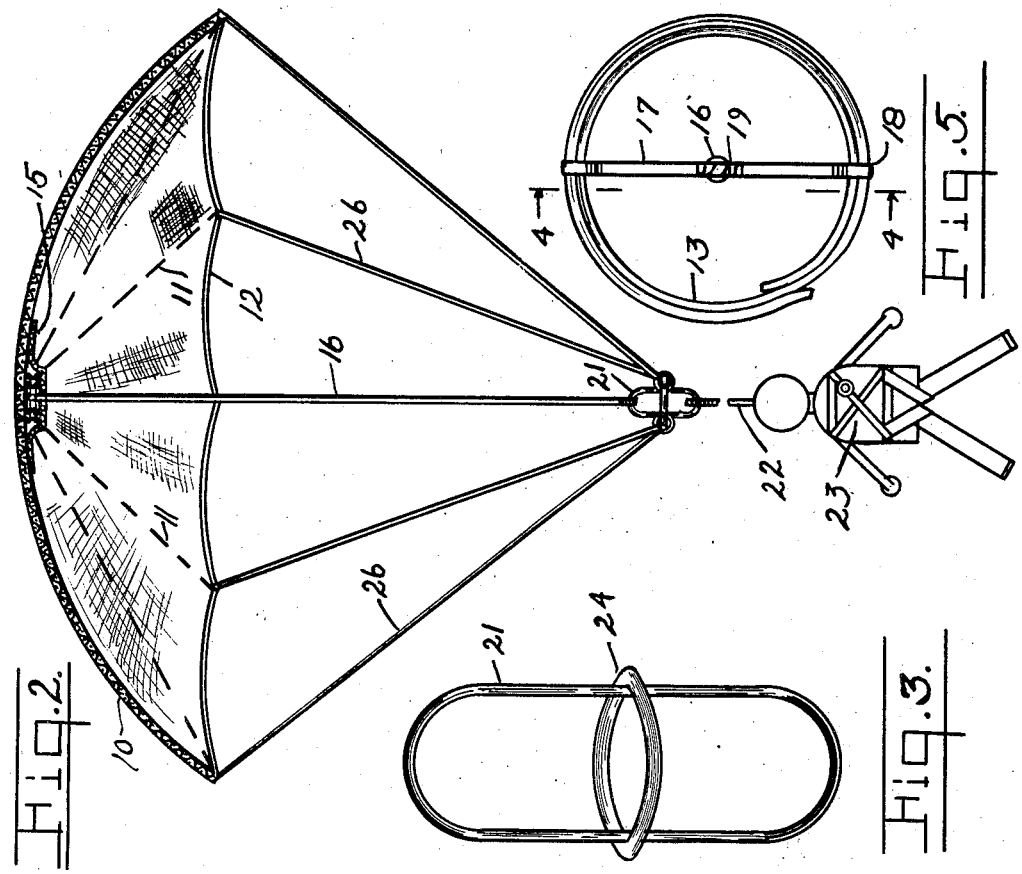
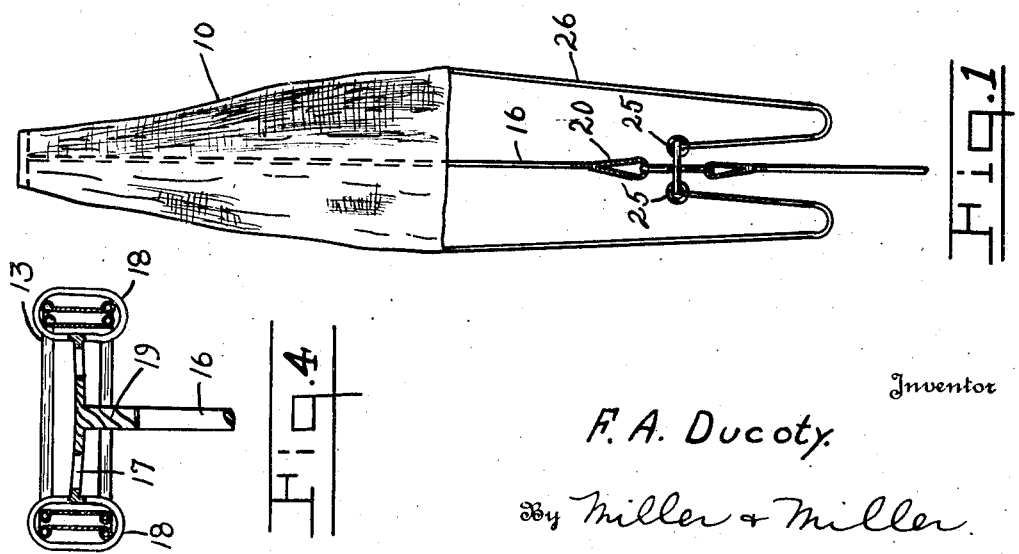
Inventor
F. A. Ducoty.
By Miller & Miller
Attorneys Patented May 3, 1932

1,857,014

UNITED STATES PATENT OFFICE

FRANK A. DUCOTY, OF MIDDLETOWN, PENNSYLVANIA

PARACHUTE

Application filed November 2, 1931. Serial No. 572,655.

This invention relates to parachutes and more particularly to details of the construction of parachutes and has for an object to provide a parachute in which the opening base line of the chute is always loose, whereby it is impossible for the chute to remain closed while descending.

A further object of this invention is to provide an improved parachute in which the base line of the chute is not held by lines in tension before the parachute has opened.

Still another object of this invention is to provide an improved parachute in which the fastenings are of standard design and manufacture.

Yet another object of the invention is to provide a parachute having an anchor line running from the center of the top at the highest point of the parachute to an improved pilot ring unit where the conventional guy lines are joined up, and therebelow an extended anchor line continues to support the person or object.

It is a further object of this invention to provide an improved pilot ring unit whereby the maximum amount of the weight of the person or object being carried is transmitted to the center or anchor line and thence to the parachute to the medium of a crown ring, while the guy lines automatically adjust themselves and perfectly balance the parachute in its operation.

A further object of this invention is to provide an improved parachute containing the above features whereby no hindrance or objectional features are created in the chute in its closed position nor is there any hindrance to the folding up, rolling up or enclosing the parachute in a carrying bag or compact.

With the foregoing and other objects in view, as will hereinafter become apparent, this invention comprises the constructions, combinations and arrangements of parts, hereinafter set forth, disclosed and shown on the accompanying drawings.

In these drawings.

Figure 1 is a plan view of the parachute in closed position ready to open.

Figure 2 is a cross sectional view of the open parachute, a dummy being shown as attached.

Figure 3 is a perspective view of the improved pilot ring.

Figure 4 is a section of the crown ring on line 4—4 of Figure 5, and

Figure 5 is a plan view of the crown ring and anchor line attached thereto.

The dome 10 of the parachute constituting this invention comprises a closed dome made of suitable parachute material and formed by stitching a plurality of pieces along the joining lines 11, the base line 12 of the dome being formed by the free ends of these pieces. Attached to the top of the dome at the center thereof is a crown ring 13 which, as shown in detail in Figures 4 and 5, may be double to provide the necessary strength. This crown ring 13 is secured to the bottom of the dome 10 by suitable reinforcement 15 within the dome, additional similar reinforcement being provided on the top of the dome if desired.

The crown ring 13 provides an attaching means for the anchor line 16, a cross line 17 being looped about opposite sides of the crown ring 13 as at 18 and spliced to the anchor line 16 as at 19, thereby providing a very secure and substantial means for anchoring the line 16 to the dome 10. The anchor line 16 is secured by a spliced loop 20 to the top of pilot ring 21, while an extended anchor line 22 looped to the bottom of pilot ring 21 forms an attaching means for the object or person 23 being carried by the parachute.

The pilot ring 21 has centrally secured thereto at right angles thereto another ring 24 whereby the rings 25 attached to the ends of the guy lines 26 may join up with the anchor line 16. The guy lines 26 are each secured to the dome 10 of the parachute along the base line 12, the guy lines being secured in a conventional manner preferably at the ends of the stitched lines 11, whereby each guy line may assist in securing adjoining sections of the dome together. There will thus be provided preferably one guy line for every dome section and each guy line will be secured to the adjoining ends of the adjacent dome sections. As will be apparent, one-half of the guy line rings 25 will be placed on the ring 24 on one side of the pilot ring 21 and the other half will be placed on the other side of pilot ring 21. By this means, when the parachute is in use, the object 23 will draw down the center of the dome 10 through the intermediary of the extended anchor line 22, the pilot ring 21, the anchor 16, to the crown ring 13. The guy lines 26 will be free of any weight, thus allowing the dome to open very quickly, there being no tension whatsoever on the base line 12. As the dome opens the guy lines 26 will cause the guy line rings 25 to automatically adjust themselves equidistantly about the ring 24, thus perfectly balancing the parachute in operation.

As will be apparent, this parachute may be packed up in the usual container for transportation and for use and when placed into use will open both quickly and positively due to the absence of any tension on the base line and to the guy lines automatically adjusting themselves without hindrance about the pilot ring.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A parachute comprising a closed dome, anchoring means secured to the top of said dome, an anchor line extending from said anchoring means, a pilot ring secured to said anchor line, guy lines secured to the base line of said dome, guy rings secured to said guy lines, a transverse ring forming part of said pilot ring, said guy rings being secured about said transverse ring, and extended anchor means depending from said pilot ring whereby said parachute bears a maximum weight through the anchor line, and its base line is free of tension during the process of opening.

2. In a parachute, a pilot ring unit comprising a vertical oblong ring and a transverse circular ring, said vertical ring providing for the attaching of an anchor line and an extended anchor line, and said transverse ring providing for the attachment of a plurality of guy line rings.

In testimony whereof I affix my signature.

FRANK A. DUCOTY.